(No Model.)

W. P. CAMBLOS & W. BITTLES.
NAILLESS HORSESHOE.

No. 546,693. Patented Sept. 24, 1895.

Witnesses.
Andrew Groupe
George W. Marter

Inventors.
William P. Camblos
and
William Bittles
per John F. Nolan
Attorney.

UNITED STATES PATENT OFFICE.

WILLIAM P. CAMBLOS AND WILLIAM BITTLES, OF PHILADELPHIA, PENNSYLVANIA, ASSIGNORS TO ELIZABETH MARION BITTLES, OF SAME PLACE.

NAILLESS HORSESHOE.

SPECIFICATION forming part of Letters Patent No. 546,693, dated September 24, 1895.

Application filed May 11, 1895. Serial No. 548,891. (No model.)

*To all whom it may concern:*

Be it known that we, WILLIAM P. CAMBLOS and WILLIAM BITTLES, citizens of the United States, residing in the city and county of Philadelphia and State of Pennsylvania, have invented certain new and useful Improvements in Horseshoes, of which the following is a full, clear, and exact description, reference being had to the accompanying drawings, forming a part of this specification.

The object of this invention is to provide a nailless horseshoe—that is to say, a shoe that may be readily and effectively clamped to the hoof of the horse instead of being nailed thereto.

The device is especially, though not exclusively, designed for use as an emergency shoe in lieu of the usual cumbersome boot-shoe.

The main feature of our invention consists in constructing the body of the shoe of two parts, which are jointed centrally of the toe portion, and in providing the heel of the shoe with a screw device of novel construction, which connects the extremities of the two sections in such a manner that they may be adjusted to clamp the lips or flanges of the shoe tightly against the horse's hoof, as will hereinafter more fully appear.

Figure 1:
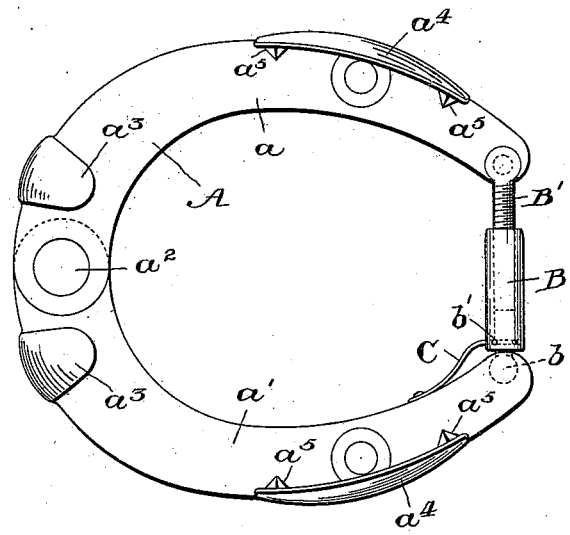
Figure 2:
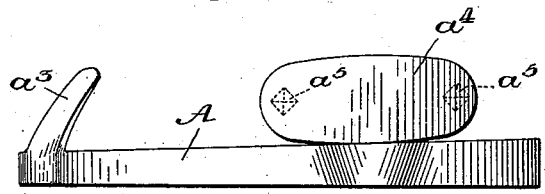
Figure 4:
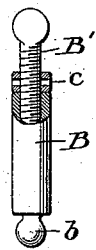
Figure 3:
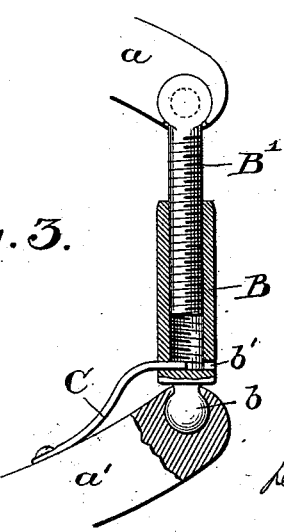

In the annexed drawings, Figure 1 is a plan of the horseshoe. Fig. 2 is a side elevation thereof. Fig. 3 is a sectional detail of the screw-clamp, enlarged. Fig. 4 is a detail illustrating a modification of retaining device for the screw-nut of the clamp.

A represents a horseshoe constructed of two sections $a\ a'$, jointed centrally of the toe portion, as at $a^2$. These sections are each provided at their forward portion with a fixed flange $a^3$, that is designed to embrace the forward part of the hoof, and with a swiveled flange $a^4$, arranged to take against the side of the hoof, such latter flange being provided on its inner face with pointed teats $a^5$, that enter the hoof and serve to retain the shoe in place.

Fitted to a socket on the inner side of the rear extremity or heel of one of the sections is the ball-shaped end $b$ of an inwardly-extending nut B, to which is fitted a screw-shank B', that is pivotally connected with the rear extremity of the other section, whereby when the said nut is properly turned the screw-shank may be drawn into or moved outwardly in the nut, so as to effect the contraction or the expansion of the pivoted sections. Inasmuch as the nut has a ball-and-socket connection with its section and the screw-shank is pivotally connected with the other section, the nut and screw are maintained in axial alignment irrespective of the adjustment of the shoe-sections. Further, as the sections are jointed centrally of the toe an equal adjustment of the sections is effected, so as to secure a uniform clamping action in the front and sides of the hoof.

As a means to obviate all liability of the nut accidentally turning while the shoe is in use, we provide the inner end of the nut with a series of suitably-disposed perforations $b'$, and pivot or affix to the adjacent side of the shoe a spring (or spring-actuated) pin C, that is adapted to be fitted to one of the holes when the requisite adjustment has been effected. When the nut is released, a key may be inserted in the holes for the purpose of turning the nut.

Instead of the spring-retaining device, we may sometimes use a jam-nut, as $c$, on the screw-shank, as indicated in Fig. 4.

We claim—

1. In a horseshoe, the combination of the two sections jointed together at the front or toe portion and provided with suitably arranged clamping ears or flanges, a screw-clamping device at the heel portion of the shoe comprising a nut pivotally connected with one of the sections and a co-acting screw shank pivotally connected with the other section, substantially as described.

2. In a horseshoe, the combination of the two sections jointed together at the front or toe portion and provided with suitably arranged clamping ears or flanges, a screw clamping device at the heel portion of the shoe comprising a nut pivotally connected with one of the sections and a co-acting screw shank pivotally connected with the other section, and locking means for the nut, substantially as described.

3. In a horseshoe, the combination of jointed sections provided with suitably arranged clamping ears or flanges, a nut connected with one of said sections by a ball and socket joint, and a co-acting screw shank pivotally connected with the opposite section, substantially as described.

4. In a horseshoe, the combination of jointed sections provided with suitably arranged clamping ears or flanges, a nut pivotally connected with one of said sections and provided with peripheral openings, a co-acting screw-shank pivotally connected with the opposite section, and a locking device constructed and arranged to engage the said openings, substantially as described.

5. In a horseshoe, the combination of the two sections jointed together at the front or toe portion and provided with swiveled clamping ears or flanges having teats or points thereon, a screw-clamping device at the heel portion of the shoe comprising a nut pivotally connected with one of the sections and a co-acting screw-shank pivotally connected with the other section, substantially as described.

In testimony whereof we have hereunto affixed our signatures in the presence of two subscribing witnesses.

WILLIAM P. CAMBLOS.
WILLIAM BITTLES.

Witnesses:
JOHN R. NOLAN,
ANDREW T. GROUPE.